C. E. HITE.
PRIMARY BATTERY.
APPLICATION FILED AUG. 16, 1906.

996,764.

Patented July 4, 1911.
2 SHEETS—SHEET 1.

WITNESSES:
Mae Hofmann
Jas. C. Wobensmith

INVENTOR
Charles E. Hite,
BY
Jno. E. Worsdale
ATTORNEY.

COLUMBIA PLANOGRAPH CO., WASHINGTON, D. C.

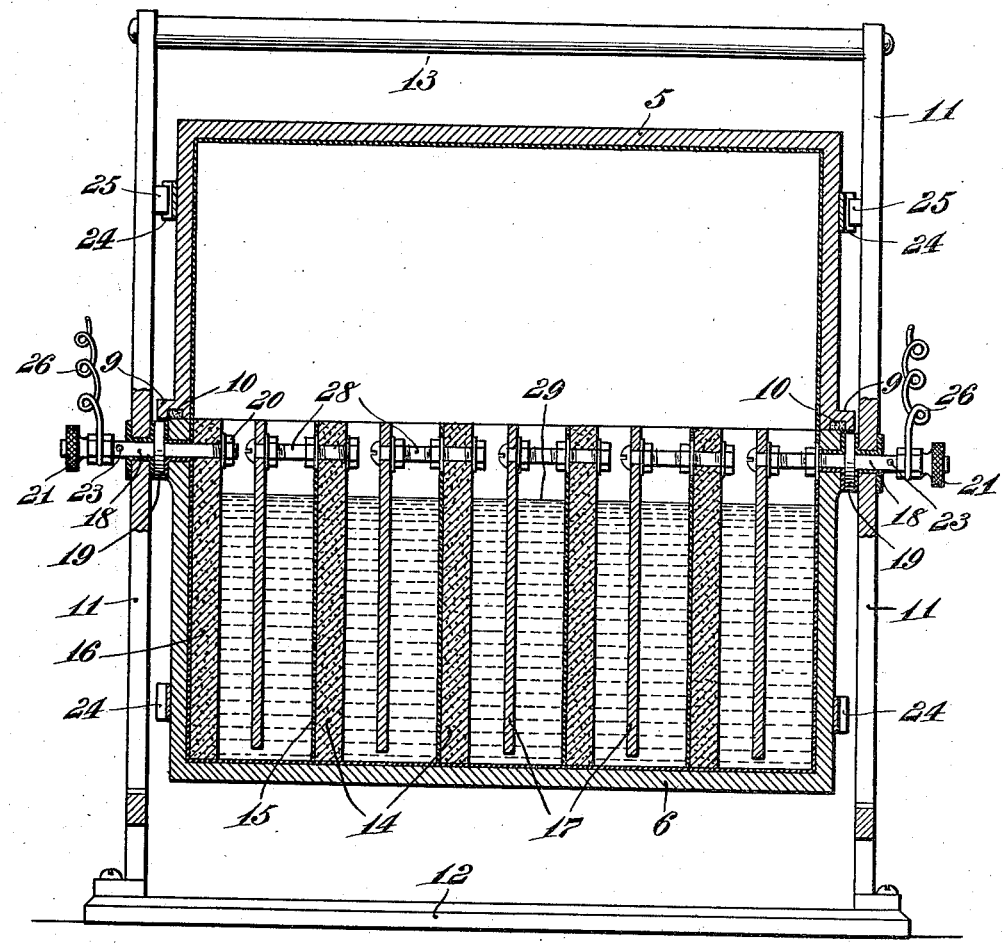
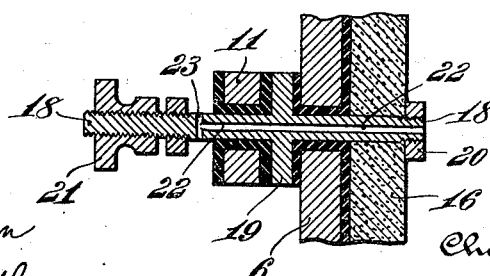

UNITED STATES PATENT OFFICE.

CHARLES E. HITE, OF BURLINGTON, NEW JERSEY.

PRIMARY BATTERY.

996,764.  Specification of Letters Patent. Patented July 4, 1911.

Application filed August 16, 1906. Serial No. 330,774.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

My object is to provide an improved battery and means for increasing its life and efficiency.

My invention comprises special means for conveniently rendering the same active or inactive as desired.

My invention comprises a mechanical means for the distribution of an electrolyte for a plurality of cells contained in one receptacle, whereby the electrolyte is automatically separated into various equal amounts as the distribution takes place, and means whereby the electrolyte is removed from said cells when it is desired to put the battery out of use.

Figure 1:
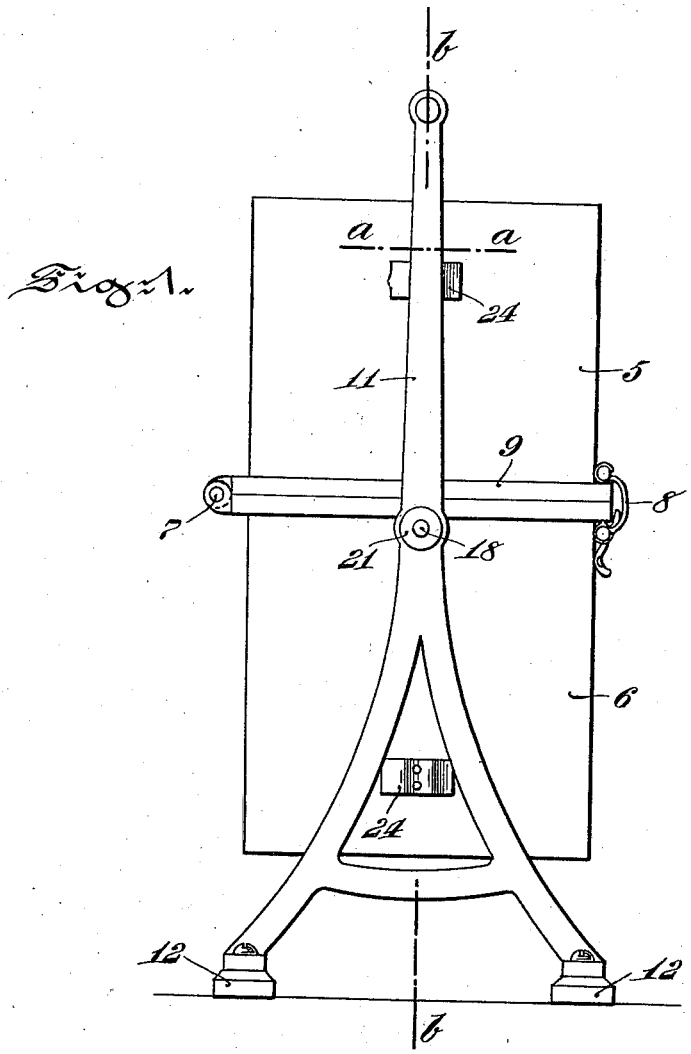
Figure 2:
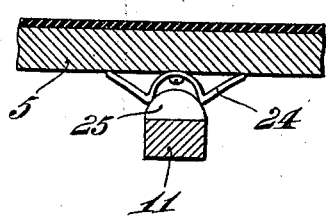

Referring to the drawings:—Figure 1 is a side elevation of my device. Fig. 2 is a horizontal section on line $a$—$a$ of Fig. 1. Fig. 3 is a vertical cross section on line $b$—$b$ of Fig. 1. Fig. 4 is a sectional detail on an enlarged scale of one of the axial supporting and binding posts.

Similar numerals refer to similar parts throughout the several views.

The battery receptacle is composed of the two box sections 5 and 6, which may be formed of iron coated with enamel or other acid resisting non-conducting material. These box sections are hinged together at 7 and provided with a disengageable, over the center, clamping device, as at 8, of great efficiency, in order to maintain a liquid tight relationship between the two sections. The flange 9 of one box section is channeled to receive a rubber gasket 10 to form a liquid tight joint between said two box sections. The structure formed of box sections 5 and 6 is adapted to rotate about a centrally disposed axis in journaled boxes in standards 11. Standards 11 are provided with the supporting bases 12 and the connecting handle 13 as a brace for the upper end of said standards, and for convenience in carrying the battery about. In one of the box sections for example, box section 6, are provided a series of electro-negative plates 14, such for example as carbon, sealed in the box around three edges and at equal distances. Each of said plates is covered on one face only with a coating of insoluble non-conducting material 15. These plates 14 with their coatings 15 divide the box 6 into a number of compartments. A terminal carbon 16 is provided at one end of the box which needs no coating 15 as described with respect to the others. In each compartment formed by the said carbon plates are provided the electro-positive plates or electrodes 17, such for example, as zinc. The zinc plates are electrically connected and physically supported by aluminum bolts or rods 28 to the adjoining carbon 14 whose active face is in an adjoining compartment. The terminal carbon 16 at one end of box 6 is secured to the axially supporting binding post 18. This binding post 18 has a flange 19 on the outer side of box 6 so that the flange will be pressed tightly against the box 6 upon screwing up the nut 20 against the carbon plate 16. This binding post then has a journaled extension through the upright 11 and terminates in a thread for receiving the usual thumb nut 21 for securing the wire connection. A similar post on the other side of the box is adapted to maintain in a similar way the terminal zinc electrode 17. Each of the axial posts 18 is also provided with the channel 22 extending longitudinally from the end projecting into box 6 to near its outer end where it connects with a transverse channel 23 passing through said post 18, thereby forming an air exit for the escape of gases from the battery receptacle. The bolts or rods and coöperating nuts supporting the various electrodes, are preferably made of aluminum which is unaffected by the electrolyte, and thereby easily operate to replace any of the positive electrodes when the same need renewing. Springs 24 are provided on each box section for coöperation with the lug or projection 25 upon the upright 11 to maintain the battery receptacle in either position as hereinafter described. In the compartments now formed and disposed, is poured a suitable electrolyte such for instance as chromic acid, nearly filling the box section 6 as indicated by the line 29. Suitable wires 26 being connected with the binding post the battery is ready for action.

When it is desired to stop the action of the battery the receptacle formed of the box sections 5 and 6 is inverted so that box 6 will assume the uppermost position when the electrolyte will run into the box section 5 from the compartments formed by the carbon electrodes in box section 6, and the electrodes 14 and 17 are thereby entirely free from contact with said electrolyte. The spring clips 24 serve to maintain the said box in said position until again manipulated. In returning the battery back to the former position as shown in Fig. 3 the electrolyte is run by gravity into the various compartments or cells in equal amounts, thus automatically filling them from the one liquid, and at the same time preventing any electrical connection between the cells through the liquid.

The advantage of using aluminum connections with the chromic acid electrolyte, is that no salts form around the carbon and aluminum connections, such as would result from the use of other metals, therefore there is always insured a good contact, which is of great importance.

What I claim is:—

1. In a primary battery, the combination of a receptacle comprising two communicating chambers of approximately equal dimensions, one of said chambers divided into compartments by plate electrodes suitably coated on one side with an impervious material, said receptacle adapted to be inverted to cause a body of electrolyte to pass from one chamber to the other, as and for the purpose specified.

2. A battery composed of two receptacles of approximately equal dimensions, one of which is divided into compartments by plate electrodes suitably coated on one side with impervious material, the two receptacles having a gasket interposed between their contact rims to form a liquid tight joint.

3. A battery composed of two receptacles, one of which is divided into compartments or cells by plate electrodes suitably coated on one side with impervious material, all such electrode-plates except one having a zinc plate attached thereto by an aluminum connection.

4. A battery composed of two receptacles, one of which is divided into compartments or cells by plate electrodes, the said two receptacles hinged on one side and provided with a disengageable clamp lock on the other side.

5. A battery composed of two receptacles, one of which is divided into compartments by parallel electrode plate partitions and having axial terminals, one connected with the plus plate and the other with the minus plate of the battery, each axial terminal having an air passage to communicate with the interior and exterior of the battery.

6. A battery composed of two receptacles, one of which is divided into compartments or cells by plate electrodes and provided with an air passage for the escape of accumulating gases, communicating with the exterior when the battery is closed, said passage adapted to occupy the same relative position with respect to the electrolyte when the battery is in either the active or the inactive position.

CHARLES E. HITE.

Witnesses:
EUGENE ZIEGLER,
MAE HOFMANN.